INVENTORS
HERBERT W. SULLIVAN
BY HENRY S. KATZENSTEIN
Darby & Darby
ATTORNEYS

March 16, 1965  H. W. SULLIVAN ETAL  3,174,141
LONGITUDINAL BOUNDARY DISPLACEMENT RECORDING SYSTEM
Filed Oct. 17, 1960  5 Sheets-Sheet 2

CORRESPONDING TO MAGNETIZATION PATTERN OF FIG. 1A

CORRESPONDING TO MAGNETIZATION PATTERN OF FIG. 1B

CORRESPONDING TO MAGNETIZATION PATTERN OF FIG. 1C

INVENTORS
HERBERT W. SULLIVAN
BY HENRY S. KATZENSTEIN
Darby & Darby
ATTORNEYS

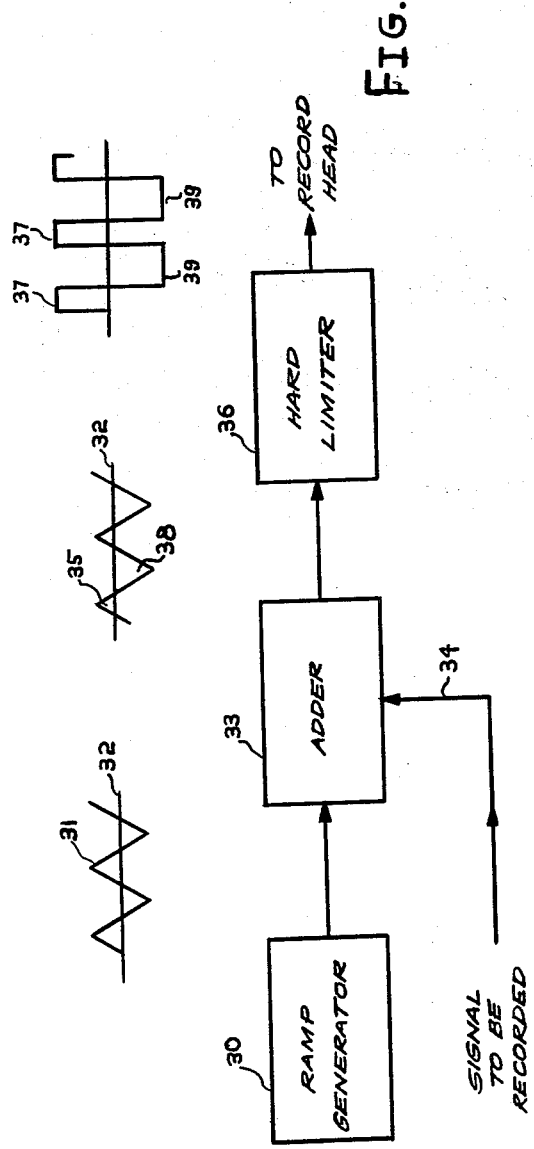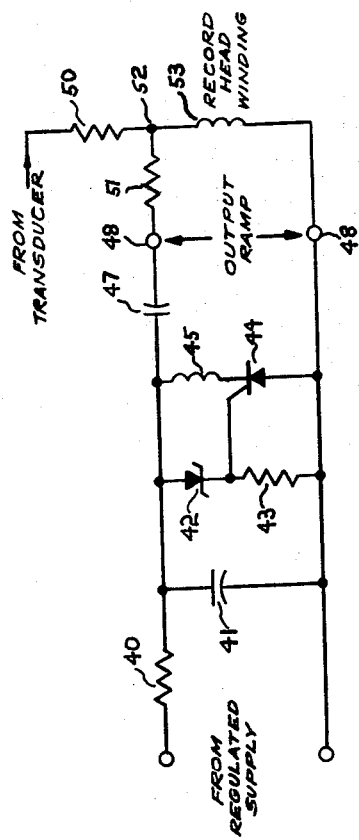

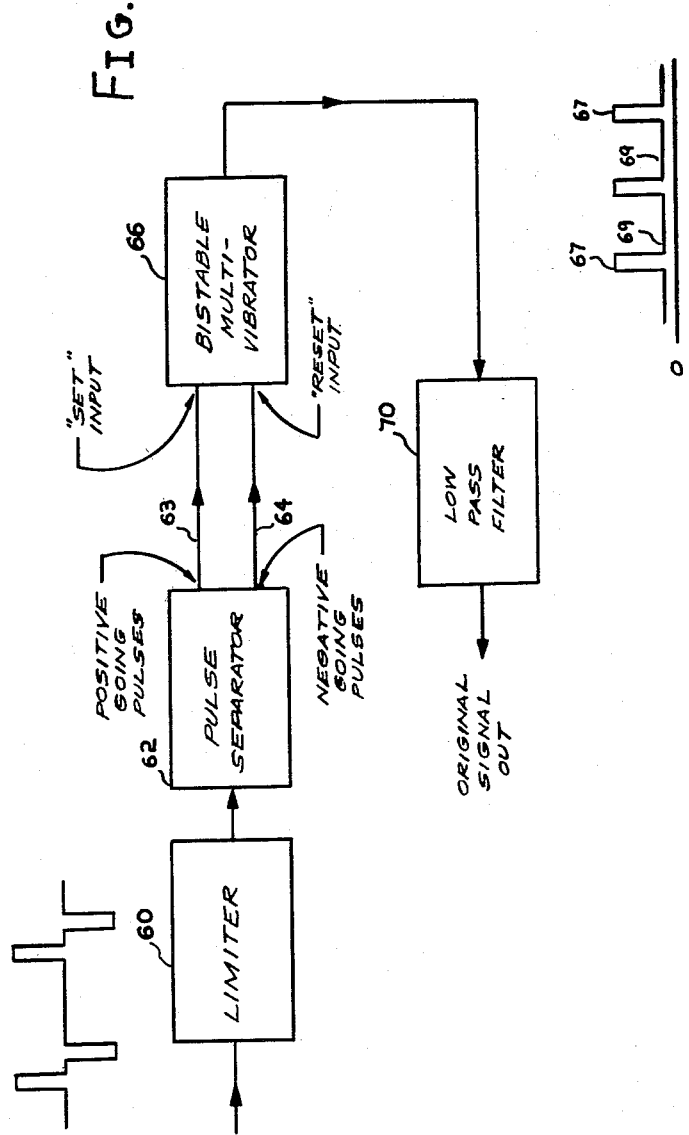

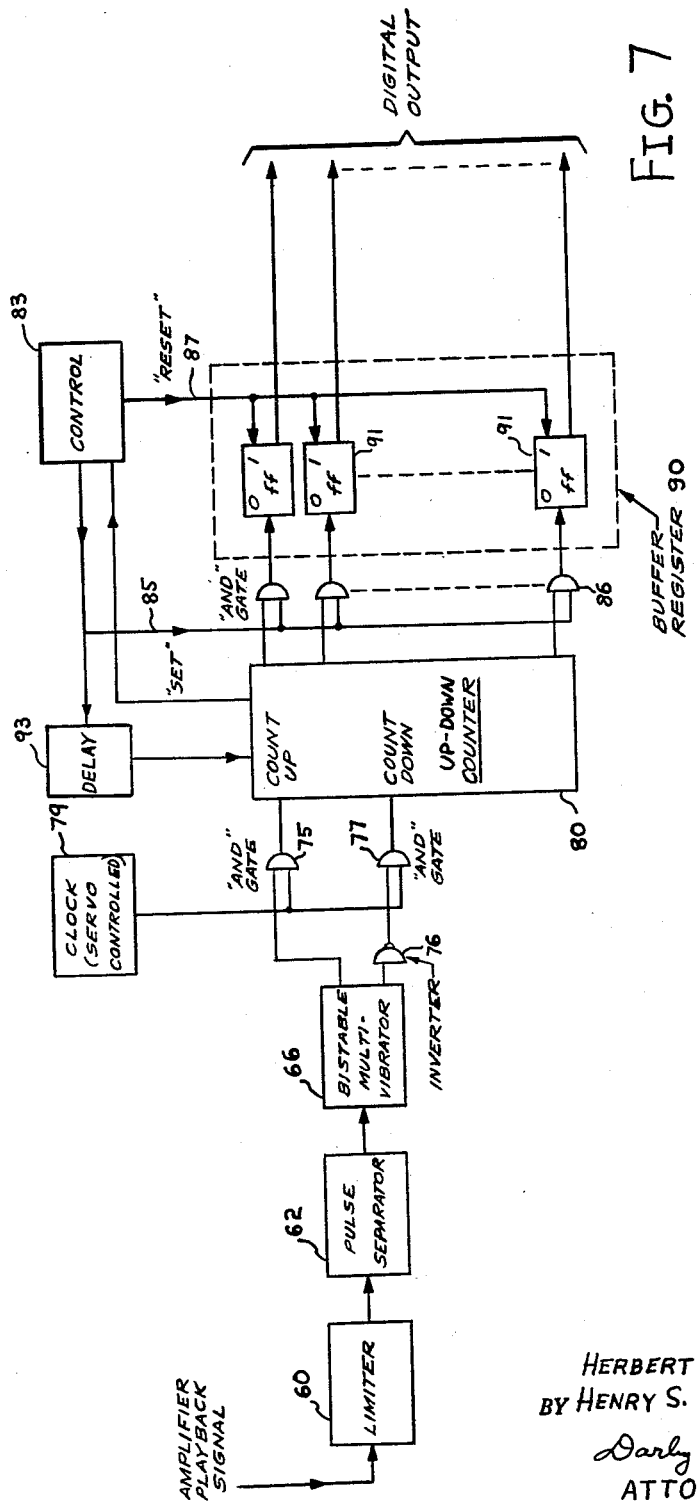

3,174,141
LONGITUDINAL BOUNDARY DISPLACEMENT
RECORDING SYSTEM
Herbert W. Sullivan, New York, N.Y., and Henry S. Katzenstein, Leonia, N.J., assignors to Lear Siegler, Inc., Long Island City, N.Y., a corporation of Delaware
Filed Oct. 17, 1960, Ser. No. 62,963
18 Claims. (Cl. 340—174.1)

This invention relates to the field of recording information and more particularly to a system for recording information on a magnetic storage medium in which the recorded signal is represented by varying longitudinal boundaries between successive segments on the medium which are magnetized in opposite senses.

One of the major limitations encountered in the use of conventional magnetic recording and reproducing equipment is the inability of the equipment to reproduce direct current and very low frequency signals such as, low frequency sounds, information from steam gauge or heat gauge transducer systems, telemetry signals, etc. As is well known, this limitation arises from the fact that the magnetic reproducing head responds to the rate of change of flux recorded on the magnetic tape. Therefore, when the recorded flux is a constant, indicative of a recorded direct current signal, or changes at a very low frequency, indicative of a recorded low frequency signal, the output from a conventional magnetic reproducing head is zero or exceedingly small. This is true because the rate of change flux through the head (the derivative of the flux picked up from the tape) is also zero or exceedingly small. It is therefore extremely difficult to reproduce these signals.

Several systems are known in the prior art which are designed specifically for reproducing direct current on low frequency signals. One such system utilizes the technique of frequency modulation of the direct current on a low frequency data signal to be recorded on a high frequency carrier signal. Another technique involves the recording of pulses whose width and amplitude are proportional to the frequency and amplitude of the data signal to be recorded. Both of these techniques have the same disadvantage in that they require the tape recorder-reproducer to have an operating bandwidth which is several times greater than the bandwidth of the data signal to be recorded. This means that the recorder-reproducer must be constructed with the special care and extra components necessary to achieve the added bandwidth.

Another system for recording signals having direct current and very low frequency components on magnetic tape is lateral boundary displacement recording. In this system, special flux responsive recording and reproducing heads are necessary. In accordance with the technique of lateral boundary displacement recording, two magnetic recording heads are aligned in a direction perpendicular to the direction of tape motion. The recording heads are wound to have opposing polarities so that they respond oppositely to the same polarity signal. During recording, the position of the point at which the two magnetic recording heads abut is determined by the strength of the incoming signal to be recorded. This position is recorded on the tape and in this manner, very low frequency signals may be recorded. This system reproduces direct current and very low frequency signals but it requires flux responsive heads which are very difficult to construct with the precision required to obtain the high resolution necessary for high packing density recording.

It is the purpose of the present invention to make possible recording and reproduction of direct current and low frequency signals without the necessity of providing a recorder-reproducer whose bandwidth is considerably in excess of the input data signal bandwidth and without the use of special components such as flux responsive heads. Additionally, the present invention is capable of extending the use of conventional recorder-reproducer systems to essentially their full bandwidth capability for recording direct current and low frequency signals.

In accordance with the operation of the invention, a longitudinal boundary displacement recording system is utilized. This system records information as a magnetization pattern on magnetic tape having alternate segments which are oppositely magnetized. The length of adjacent segments of the pattern, i.e. the longitudinal boundary between adjacent and oppositely magnetized segments, determines the amplitude and the polarity of the signal recorded. Therefore, it is the duration of the oppositely polarized segments and the position of the longitudinal boundaries which contains the analog information of the characteristics of the signal, and which determines the playback of the recorded signal.

The recording-reproducing system of the present invention has many advantages over those prior art systems discussed above and others. First of all, it does not require the wide bandwidth which frequency modulation or pulse width modulation techniques need. This is usually in the range of five times the bandwidth of the signal recorded. The present system also provides maximum utilization of the tape while retaining the reliability of pulse-recording. Further, since it is the duration of the segments of the magnetic pattern on the recording medium that contains the analog information and not the amplitude of the signal recorded thereon, there are no linearity problems associated with the design of the playback system. Other advantages of the system are that conventional recording heads may be adapted to be used with it and up to fourteen tracks can be recorded on a standard 1 inch wide tape by stacking the recording heads. Another advantage of the system is that tapes are interchangeable and a tape that is recorded on one machine can be played back on another if desired. The system of the present invention can also have either analog or digital readout and direct digital readout of the recorded information is available without the use of an analog-to-digital converter.

It is therefore an object of this invention to provide a system of recording and reproducing using the longitudinal boundary displacement of recorded segments.

A further object of the invention is to provide a system for the recording and reproduction of direct current and low frequency signals.

Another object of this invention is to utilize a system of recording wherein the duration of adjacent oppositely magnetized segments of a magnetic pattern determines the characteristics of the recorded information.

A further object of the invention is to provide a system wherein information is recorded in the form of adjacent oppositely magnetized segments of a pattern and reproduced in analog or digital form.

Still another object of the invention is to provide a system in which information may be recorded and reproduced directly in digital form without the use of an analog-to-digital converter.

Other objects and advantages of the present invention will become more apparent upon reference to the following specification and annexed drawings in which:

FIGURES 1A, 1B and 1C illustratively show the recorded magnetic flux patterns for signals of different amplitudes and polarities;

FIGURES 2A, 2B and 2C illustratively show the total flux through a pick-up head in reproducing the respective flux patterns of FIGURES 1A, 1B, and 1C;

FIGURES 3A, 3B, and 3C illustratively show the rate of change of flux through the reproducing head for the respective flux patterns shown in FIGURES 1A, 1B, and 1C;

FIGURE 4 is a schematic block diagram of a circuit which produces the recording flux patterns shown in FIGURES 1A, 1B, and 1C in accordance with various input signals;

FIGURE 5 is a diagram of a circuit which may be used for certain of the components shown in the block diagram of FIGURE 4;

FIGURE 6 is a schematic block diagram of a reproduction system for use with the recording system of the present invention in which the information is reproduced in analog form; and FIGURE 7 is a schematic block diagram of a reproducing system for reproducing the recorded information in digital form.

Figure 1A:
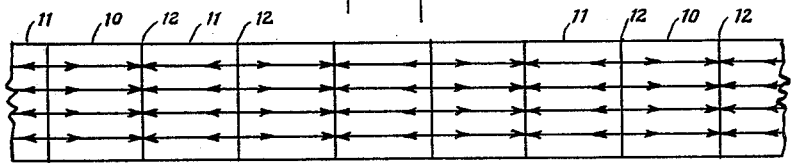
Figure 1B:
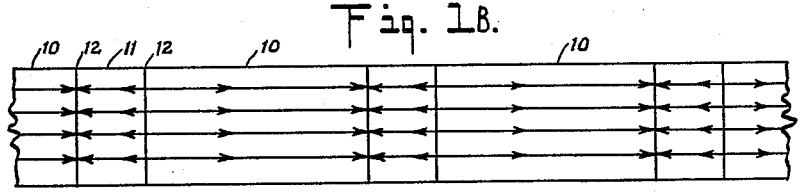
Figure 1C:
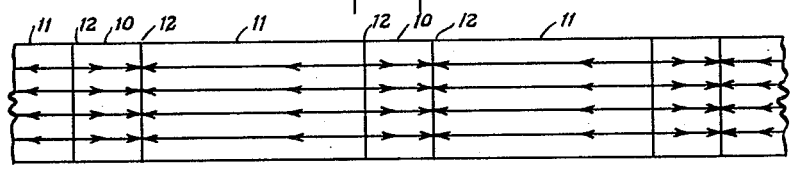

In order to understand the operation of the longitudinal boundary displacement recording system reference is made to FIGURES 1A–1C which show, in a manner intended for purpose of explanation, the patterns of flux recorded on a magnetic storage medium in response to different input signals. Each of the patterns of FIGURES 1A, 1B and 1C, represents only a single track of information recorded on a magnetic tape and it should be realized that a plurality of tracks may be recorded on a single tape by stacking the recording heads, and by providing each head with the appropriate circuits.

In FIGURE 1A, the recorded magnetic flux pattern of the single track has a plurality of oppositely magnetized adjacent segments 10 and 11 which are separated by a respective boundary 12. It should be realized that only a portion of a complete recorded track is shown. The arrowheads pointing to the right in each of the segments 10 indicates that the recording flux was of a polarity to orient the magnetic particles in the segments of the tape in that direction. Similarly, the arrowheads pointing towards the left in each of the segments 11 represents that the magnetic particles in those segments are magnetized in the opposite sense from the particles in the segments 10. The longitudinal boundaries 12 indicate the transition areas during which the sense of magnetization changes from one direction to the other. In this manner a pattern having oppositely magnetized adjacent segments and the boundaries between adjacent segments is represented.

In the present system, the magnetization pattern shown in FIGURE 1A is indicative of the recording of a signal of zero amplitude. This is represented by each of the segments 10 and 11 being of equal duration and, therefore, the longitudinal boundaries 12 being spaced equidistant along the track.

FIGURE 1B illustrates the magnetization pattern when an input signal of one polarity is being recorded. In the present case, consider that a positive signal of a fixed amplitude is being recorded. It should be noted that the duration of the segments 10 is now greater than the duration of the segments 11. Because of the change of the duration of the respective patterns 10 and 11 the respective boundaries 12 have shifted so that they are no longer equally spaced.

FIGURE 1C shows the flux pattern recorded in response to a signal of a polarity opposite (negative) from FIGURE 1B, having approximately the same amplitude as the signal (positive) of FIGURE 1A. For this signal, the segments 11 are of longer duration than the segments 10. Again, the boundaries 12 between the oppositely magnetized segments have shifted.

It should be realized that signals of any polarity and amplitude may be recorded and be represented by the patterns similar to those shown in FIGURES 1A, 1B, and 1C. The polarity of a signal is indicated by which segments (10 or 11) have the longest duration and the amplitude of the signal is represented by the duration of the segments. Stated another way, the positions of the longitudinal boundaries 12 determine the polarity and magnitude of the recorded signal.

The magnetization of the information tracks of the tape shown in FIGURES 1A–1C is accomplished by driving a recording head in a suitable fashion. In a preferred form of the invention, the magnetization is carried to such an extent as to fully saturate the magnetic recording medium. When recording is carried out in this manner, the highest possible signal to noise ratios are obtained.

Figure 2A:
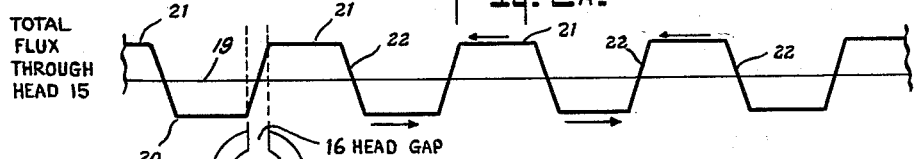
Figure 2B:
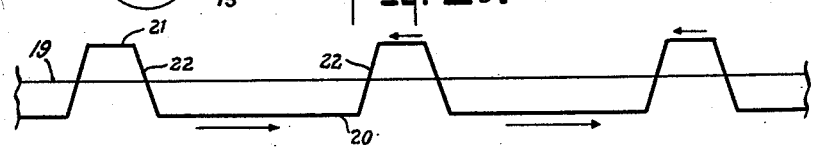
Figure 2C:
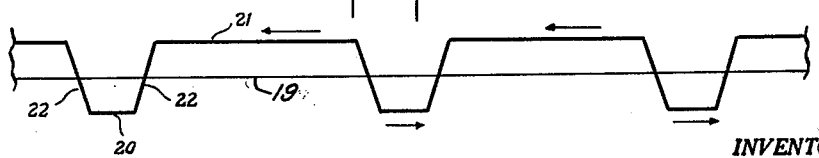

The total flux through a reproducing head in response to the magnetization patterns of FIGURES 1A, 1B, and 1C is respectively shown in FIGURES 2A, 2B and 2C. A cross-section of a reproducing head 15 is shown above FIGURE 2A with a greatly exaggerated gap 16. As the tape moves across the head 15 the total flux in the gap 16 rises and falls in accordance with the flux pattern previously recorded on the tape.

FIGURE 2A shows the flux through the reproducing head in response to the magnetic recording pattern of FIGURE 1A. The flat lines 21 appearing above the base line 19 correspond to the segments 11 of the pattern in which the magnetization is in one direction, as shown by the arrowheads to the left. The lines 20 appearing below the base line 19 are representative of segments 10 of the pattern in which the magnetization is in the opposite direction, as shown by the arrowheads pointing to the right of the drawing. The slant lines 22 joining the lines 20 and 21 correspond to the head gap 16 passing a boundary 12. The line 22 is slanted and not vertical since the flux through the head cannot change instantaneously. There must therefore be a gradual transition of the flux through the head from one direction to the other. It should be noted that the total flux through the head in response to the pattern of FIGURE 1A, has equal periods of positive and negative sense above and below the base line 19, corresponding to the equal duration but oppositely magnetized segments 10 and 11 of the recorded pattern.

In a similar manner, FIGURES 2B and 2C show the flux through the head for the corresponding magnetization patterns of FIGURES 1B and 1C. In FIGURE 2B, the lines 20, representing the longer duration segments 10, are correspondingly longer than lines 21, representing the shorter duration segments 11. In FIGURE 2C, the lines 21 are of longer duration than the lines 20 since the segments 11 were originally of longer duration than the segments 10. In a similar manner the reproducing head has other flux waveforms passing through it corresponding to the position of boundaries 12 and the duration of the respective segments 10 and 11.

Figure 3A:
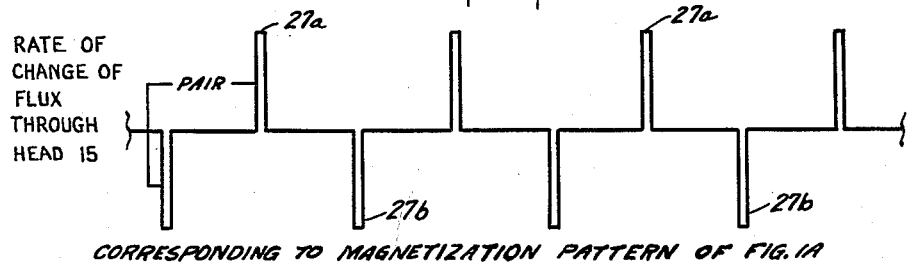
Figure 3B:
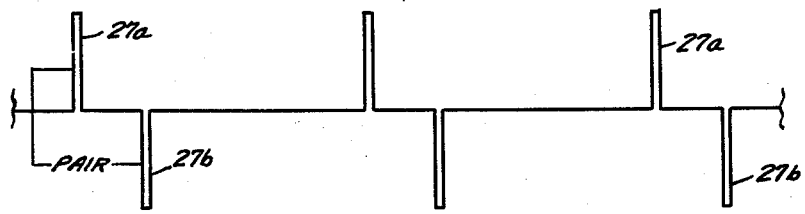
Figure 3C:
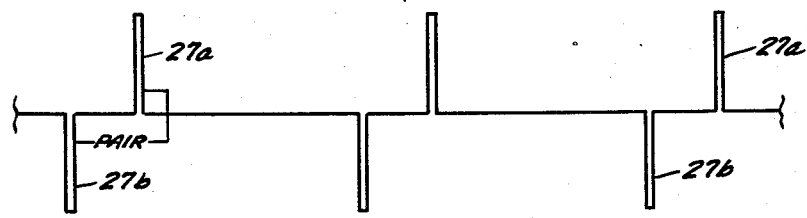

In a reproducing system it is the rate of change of flux through the reproducing head gap which is important. The rate of change of flux through a recording head for the flux patterns of FIGURES 2A, 2B and 2C is respectively shown in FIGURES 3A, 3B and 3C. Each of the pulses 27 in FIGURE 3 is representative of a transition line 22 of FIGURE 2, which is representative of the transition of the flux through the head from one direction to another. The transition lines 22, as previously explained, correspond to the boundaries 12, which shift their spacing longitudinally along the recording track in accordance with the amplitude and polarity of the recorded signal. It is assumed, for the purposes of explanation, that differentiation of the slanted lines 22 produces the substantially rectangular pulses 27 of positive and negative polarity. So long as the flat portions exist in the flux waveforms of FIGURE 2, that is, so long as the reproducing gap 16 is smaller than one of the elementary segments 10 or 11, the differentiated head output waveforms of FIGURE 3 contain all of the information necessary for the reproduction of a direct current signal.

When the rate of change of flux through the head 15 is from the negative to a positive direction, as shown in FIGURE 2 by the transition lines 22 going from a line 20 to a line 21, a positive pulse is produced. Similarly, negative pulses are produced when the transition lines 22 go in the opposite direction. Stated another way, the leading edge of a pulse of FIGURE 2 produces a positive pulse and the trailing edge produces a negative pulse.

It should be noted that due to the longitudinal shifting of the boundaries 12 that the spacing of the two pulses 27a and 27b in the pairs of pulses, corresponding to adjacent positive and negative going transition lines 22, is shifted accordingly. In FIGURE 3A the pulses in the pairs are alternately positive 27a and negative 27b and equally spaced with respect to each other. This indicates that the boundaries 12 were spaced equidistant as in FIGURE 1A. In FIGURES 3B and 3C, which correspond respectively to the magnetization patterns of FIGURES 1B and 1C, pulses 27a and 27b for the pulse pairs are produced which are spaced closer together. It should be noted that in the pulse pairs of FIGURE 3B a positive pulse 27a appears first and then a negative pulse 27b, while in the pulse pairs of FIGURE 3C a negative pulse 27b is produced first and then a positive pulse 27a. This occurs due to the original polarity of the signal which was recorded. When positive polarity signals are recorded, the positive pulse precedes the negative pulse in the pulse pair, as shown in FIGURE 3B, and when negative polarity signals are recorded the negative pulse precedes the positive pulse in the pulse pair, as shown in FIGURE 3C. The spacing between the pulses of a pair is indicative of the amplitude of the signal recorded. This is so because the larger the amplitude of the signal, the longer is the duration of the larger segment 10 or 11, thereby shifting two boundaries 12 closer together and making the spacing of the pulses in their representative pulse pair appear closer together.

Referring now to FIGURE 4 a schematic block diagram is shown of a system for producing the magnetic recording patterns shown in FIGURES 1A, 1B and 1C. A ramp generator 30 is provided which produces a triangular output waveform 31, as shown above the output line of the ramp generator 30. Any suitable vacuum tube or semiconductor circuit which is known in the art may be used to produce the triangular wave. The triangular waveform 31 rides on a base reference line 32. The output of the ramp generator is applied to the input of an adder 33 which has as its other input over line 34 the signal to be recorded. The adder 33 may be a conventional vacuum tube circuit. The adder output is the triangular waveform 31 with the reference line 32 shifted an amount above or below the zero signal level position shown at the output of generator 30 dependent upon the amplitude and polarity of the input signal. When the reference line 32 has equal portions of the ramp appearing above and below it, a zero level input signal was applied. The upward movement of the reference line 32 indicates a positive signal, while the downward movement indicates a negative signal. The amount of upward or downward movement depends on the amplitude of the signal. In the present case, consider that a positive going input signal is applied over line 34. This positive signal shifts the base line 32 upwards toward the top of the ramp waveform an amount dependent upon the amplitude of the positive signal, to produce the small positive and large negative portions 35 and 38.

The signal at the output of the adder 33 is applied to the input of a limiter 36 which converts the ramp waveform into a series of rectangular waves. A typical limiter circuit operates as follows. The signal at the output of the adder 33 is inverted by an amplifier (not shown) and the inverted signal is then applied to the input of an overdriven vacuum tube amplifier (limiter) which is biased to conduct heavily in response to a positive signal and to be cut off in response to a negative signal. Therefore, the positive peaks 35 of the ramp waveform originally appearing above the zero axis 32, which are now inverted, keeps the limiter cut-off and positive going pulses 37 appear at the limiter output. The portion of the ramp 38 appearing below the baseline 32, which is now inverted into a positive signal, makes the vacuum tube conduct, and negative going pulses 39 appear at its output. Therefore the output of the limiter 36 is a series of positive and negative rectangular pulses 37 and 39 with the portions 35 of the ramp above the zero axis 32 causing the production of the positive rectangular pulses 37 and the portions of the ramp 38 below the zero axis causing the production of the negative rectangular pulses 39. It should be noted that in response to the positive input signal that the positive rectangular pulses 37 are of shorter duration than the negative pulses 39. This occurs because the reference line 32 was shifted upwardly toward the positive peak of the ramp. Therefore the duration of the respective pulses 37 and 39 is dependent upon the position of the reference line 32. In a similar manner rectangular pulses are produced in response to a negative input signal. In this case, the positive pulses 37 would have a longer duration than the negative pulses 39. When there is no input signal, the reference line is not shifted and the pulses 37 and 39 are of equal duration.

The series of rectangular puses 37 and 39 are applied to the recording head in order to produce the magnetization patterns shown in FIGURE 1. In the example being described, the rectangular pulses 37 correspond to the segments 11 of the pattern wherein the tape is magnetized as represented by the arrowheads pointing to the left of the drawing. The rectangular pulses 39 correspond to the segments 10 of the pattern which are oppositely magnetized as represented by the arrowheads pointing to the right of the drawing.

It should be realized that all of the recorded patterns shown in FIGURE 1 and other patterns in which the boundaries 12 are shifted different distances than those shown, may be achieved. For example, when the input signal to be recorded has a zero level, the reference line 32 has equal portions of the ramp 31 appearing above and below it (FIGURE 4). Therefore, the pulses 37 and 39 are of equal duration and the magnetization pattern shown in FIGURE 1A is produced. When a negative input signal is applied to the adder 33, the zero axis 32 is shifted downward so that a smaller portion of the ramp extends below it. This means that at the output of the limiter the positive pulses 37 are of longer duration than the negative pulses 39. This produces the recording pattern shown in FIGURE 1C. Since the durations of the respective pulses 37 and 39 are dependent upon both the amplitude and the polarity of the input signal to be recorded, the magnetization pattern has longitudinally shiftable boundaries 12 whose positions depend upon the amplitude and polarity of the input signal.

In order to derive the maximum benefit from the recording system the frequency of the ramp generator 30 should be chosen to be higher than the maximum frequency that the tape recorder-reproducer can reproduce. In normal pulse width modulation techniques, the pulse recurrence rate is at least twice that of the highest frequency signal. With the proper choice of the ramp frequency, even the higher frequency signals shift the reference line 32 of the ramp waveform thereby producing the rectangular pulses 37 and 39 which are indicative of the patterns to be recorded. The actual recording is done in the manner described above. By properly selecting the ramp frequency, the higher frequencies of the signal to be recorded are made to fall within the bandwidth capabilities of the recorder-reproducer and the low frequencies and direct current components are also recorded and reproduced faithfully. Therefore, the full bandwidth capabilities of the recorder-reproducer are utilized.

FIGURE 5 is a diagram of a circuit for accomplishing the ramp produceion, adding, and rectangular wave producing functions of the block diagram of FIGURE 4. An RC network, formed by a resistor 40 and a capacitor 41, is connected across the input terminals of a regulated power supply (not shown). The capacitor 41 charges toward the power supply voltage through resistor 40 at a nearly constant rate thereby forming the leading edge of the ramp waveform. A zener diode 42 and a resistor 43 are connected in series across the capacitor 41. When the voltage across capacitor 41 exceeds the zener breakdown voltage, the zener diode 42 conducts and passes a voltage to a control rectifier 44 causing it to fire. Rectifier 44 is preferably of the silicon type. When control rectifier 44 fires it provides a discharge path through the diode 42 and the rectifier 44 for capacitor 41. The discharge of the capacitor 41 is also effected in a linear mnner to produce the trailing edge of the ramp signal. A small valve inductance 45 is connected to the control rectifier 44 to ensure its turnoff after the capacitor has been discharged.

The desired ramp function is passed through the capacitor 47 and appears across output ramp terminals 48. The input signal to be recorded, which originates from a transducer, such as a microphone, strain gauge, temperature sensitive element, resistance arm of a measuring bridge, etc., is added at junction 52 to the ramp waveform through a resistor 50. The ramp wave form passes through a resistor 51 to the junction. The input signal shifts the reference level of the ramp function up and down dependent upon its magnitude and polarity. The desired limiting and production of the rectangular positive and negative pulses is accomplished by saturating a portion of the magnetic circuit of a recording head 53. Therefore, when the ramp signal rises above or below the saturation level, the recording head saturates and its effective recorded pattern is the same as that produced by a rectangular input signal.

FIGURE 6 shows a schematic block diagram of a system for reproducing the recorded signal in analog form. The signals which are produced in response to the rate of change of flux passing through a reproducing head, as shown in FIGURE 3, are applied to the input of a limiter 60. The limiter is not absolutely essential for proper operation of the system. However, since tape recorder systems usually introduce a considerable amount of spurious amplitude modulation into the reproduced signal, the limiter 60 eliminates the spurious signals and reconstructs a waveform of a train of pulse pairs similar to the ones shown in FIGURE 3. It should be recalled that the pulses in the waveforms of FIGURE 3 are of substantially the same amplitude and width and their spacing and respective polarity sequence represents the amplitude and polarity of the recorded signal.

The output of the limiter 60 is applied to the input of a pulse separator 62 which has two output lines 63 and 64. The pulse separator 62 may be any suitable circuit, for example, a pair of diodes, one of which is biased to pass positive polarity pulses and the other biased to pass negative polarity pulses. In this arrangement, the diode which passes positive pulses produces the positive output pulse on line 63, and the diode which passes the negative pulse produces these negative output pulses on line 64. The pulses on lines 63 and 64 are fed to the inputs of a bistable multivibrator 66 (flip-flop), lines 63 and 64 being, respectively, connected to the multivibrator "set" and "reset" inputs. The presence of a pulse on the "set" line 63 causes the multivibrator to assume the "1" state and produce a positive output pulse 67 and maintain this condition until a pulse appears on reset line 64. A pulse on the "reset" line 64 flips the multivibrator to the "0" state and a negative going pulse 69 is produced at its output. The multivibrator maintains the "0" state until it receives the next "set" pulse on line 63. Therefore, the duration of the positive pulses 67 is dependent upon the spacing of the pulses of the reproduced signal, which in turn is a function of the longitudinal spacing of the boundaries 12.

The output waveform of the bistable multivibrator 66 has substantially the same pulse duration and pulse spacing as the waveform at the output of the limiter 36 of FIGURE 4. This may be explained by the following example: It will be recalled in the example described that the input signal which produced the waveform of FIGURE 4 was positive going, thereby producing the magnetization pattern on the tape shown in FIGURE 1B. The rate of change of flux through the reproducing head for the flux pattern of FIGURE 1B is shown in FIGURE 3B. When the signal of FIGURE 3B is used to trigger the bistable multivibrator 66, the "set" (positive) pulse appears prior to the "reset" (negative) pulse and the pulse pairs are spaced close together. The duration of the "1" (positive) output from the multivibrator 66 is relatively short since the "reset" pulse is spaced close to the "set" pulse, thereby producing a short duration positive pulse 67. Since the duration between the "reset" (negative) pulse and the next "set" (positive) pulse is relatively long, the multivibrator produces a "0" output pulse 69 for a longer period of time. It may be readily seen that the output of the bistable multivibrator 66 varies in accordance with the polarity sequence and spacing between the respective pulses at the input of the pulse separator 62. This is, as previously pointed out, a function of the longitudinal boundary spacing of the recorded pattern.

The output of the bistable multivibrator 66 contains signal components of the original signal frequency, components at the ramp frequency, components above the ramp frequency due to the sum of the modulation of the ramp and signal frequencies, and no others. Since the ramp frequency was originally selected to be higher than the highest frequency which the recorder-reproducer can utilize, a low pass filter 70 is used to filter out all the components of the multivibrator output signal at and above the ramp frequency, passing only those frequencies below the ramp frequency. The signal components below the ramp frequency are those of the recorded input signal. Stated another way, the low pass filter 70 averages out the pulses 67 and 69 to produce the analog output signal. In this manner, the original signal is reproduced in analog form.

In many cases it is desirable to reproduce the recorded signal in digital form. This may be accomplished by the analog reproducing system shown in FIGURE 6 upon the addition of an analog-to-digital converter at the output of the filter 70. FIGURE 7 shows an arrangement which reproduces the recorder signal in digital form without the use of such a converter. The latter arrangement is preferable since it eliminates the conversion of the data from analog to digital form and the equipment needed to perform the conversion. Further, there is no need to provide any linear circuit components for proper reproduction of the analog signal.

In FIGURE 7, those components which are the same as those shown in FIGURE 6 have been designated by the same reference numerals. The pulse separator 62 has positive and negative going pulses on its output lines which are used to operate the bistable multivibrator 66. The pulses from the "1" output of the multivibrator, which are positive going, are applied to one input of an "and" gate 75. The negative going pulses produced at the "0" output of the multivibrator are inverted by an inverter 76 and applied to one input of a second "and" gate 77. The other input of each "and" gate 75 and 77 receives clock pulses from a clock pulse generator 79 which preferably operates at a repetition rate which is several hundred times greater than the ramp generator frequency, i.e., several hundred clock pulses are produced during each ramp waveform.

The output pulses of "and" gates 75 and 77 are applied to an up and down counter 80. Counter 80 responds to the pulses from "and" gate 75 to count in an upward (positive) direction and to the pulses from "and" gate 77 to count in a downward (negative) direction. The counter 80 has a plurality of output lines and a respective binary digit appears on each line. The output of the counter represents the net sum of a counting cycle which includes an up and a down count. Such types of reversible counters are well known in the art and no further description of a suitable type of counter which may be used with this invention is necessary. In a preferred form of the invention the counter 80 is of the "sign" type which will give a positive or negative count, depending on whether more pulses were applied to the "up" or "down" input.

In operation, when a positive pulse causes multivibrator 66 to be in a "1" state, "and" gate 75 is opened and clock pulses are supplied to the "up" input of counter 80 and the counter counts in an upward (positive) direction. The next negative pulse from the pulse separator 62 resets multivibrator 66, closes "and" gate 75, and opens "and" gate 77, thereby causing the counter 80 to count in a downward direction. As previously described, a pair of positive and negative pulses at the input of the multivibrator signifies two boundary crossings and the period between two boundaries of recorded segments of the same magnetization is the ramp period. Therefore, during each counting cycle, which is the duration of a ramp period, the counter 80 counts upwards and downwards to produce a net count. This net count represents the respective duration of positive and negative pulses at the output of the multivibrator 66, which in turn represents the spacing and polarity sequence of the reproduced signal. This is similar to the operation described with respect to the circuit of FIGURE 6.

At the end of the down count, at which time the count in the counter will represent the net sum of clock pulses received during the "1" and "0" conditions of the multivibrator 66, the counter sends a pulse to a control circuit 83. In response to this pulse, the control circuit, which may be constructed of the necessary bistable or other suitable circuits, produces a pulse on output line 85. The pulse on line 85 opens a plurality of "and" gates 86 which are connected to the respective output lines of the counter 80. When the "and" gates 86 are opened, the count present on the counter output lines is gated through to a buffer storage register 90, which is formed by a plurality of flip-flop circuits 91. The count in the counter 80 is therefore stored in the register 90 in digital form for subsequent transfer to a readout device such as a digital printer, cathode ray tube, card puncher, or for other operations. It should be realized the count stored in the register at the end of each counting cycle is indicative of the magnitude and polarity of the signal. The higher the positive count, the higher the magnitude of the positive signal recorded. Similarly, the higher the negative count, the greater was the magnitude of the negative recorded signal. A net zero count indicates a zero level input signal was recorded.

The pulse on line 85 is also applied to a delay circuit 93 which is in turn connected to the reset circuit of the counter 80. The delay of circuit 93 is selected to allow the count in counter 80 to be gated through to the register 90 and then clear the counter for the next counting cycle, by resetting it to zero.

After the information in the buffer register 90 has been utilized, the control circuit 83 sends out a reset pulse on line 87 which is used to clear the register 90 for the reception of the results of the next counting cycle. The reset pulse for the register 90 may come at any time prior to the production of the pulse on line 85, which opens the gates 86 to the register to store the next count.

If it is desired to average out a plurality of counting cycles of the counter 80, thereby increasing the accuracy of the reproduced signal, an additional counter may be provided at the output of the register 90. The added counter would, for example, take two, three or more of the counts gated into the buffer register 90. These counts would be summed and then the sum would be divided in order to get the average. In this manner, an integration of the reproduced signal is performed and the originally recorded signal is reproduced more faithfully.

While various types of circuits have been described for some of the component parts of the invention it should be realized that other suitable circuits may be utilized if desired. While a system for driving the tape has not been shown, it should be realized that any suitable system, such as a capstan drive, belt drive, pulley drive, etc., may be used. Further, the storage medium on which the recording is carried out may be a magnetic tape, magnetic wire, drum, or other suitable storage medium.

While certain preferred embodiments of the invention have been shown and described, it is to be understood that the invention may be otherwise embodied and practiced within the spirit of this disclosure and within the scope of the appended claims.

In the claims:
1. Apparatus for recording an electrical signal on a storage medium and reproducing said signal therefrom comprising means for forming a series of signals of first and second polarities having durations which are related to the polarity and magnitude of the electrical signal to be recorded, means for recording said series of signals on said storage medium as a series of adjacent oppositely polarized segments corresponding to said first and second polarities and having boundaries therebetween, said boundaries corresponding to the transition of said series of signals from one polarity to the opposite polarity, means for reproducing the signals of said recorded segments, means for forming from the reproduced segments and responsive to the boundaries therebetween a series of signals having polarities and durations corresponding respectively to the sense of polarization and the duration of a corresponding reproduced segment, and means for converting said series of signals into a signal representative of said recorded electrical signal.

2. Apparatus for recording an electrical signal on a magnetic storage medium and reproducing said signal therefrom comprising means for forming a series of positive and negative pulses whose respective durations correspond to the magnitude and polarity of the electrical signal, means for recording said pulses on said magnetic storage medium as a series of adjacent segments which are oppositely magnetized in one sense or another depending upon the polarity of the pulse to be recorded, each adjacent pair of oppositely magnetized segments having a boundary therebetween and the position of the boundaries between said segments being shifted in accordance with the duration of the recorded pulses, means for reproducing the signals of said recorded series of segments, means for forming from each segment a positive or negative pulse whose respective duration is related to the duration of the corresponding segment, thereby forming a series of positive and negative pulses, and means for recovering the magnitude and polarity of the electrical signal from said series of pulses.

3. Apparatus for recording an electrical signal on a storage medium and reproducing said signal therefrom comprising means for producing a ramp waveform having a reference level, means for adding said electrical signal to said ramp waveform to shift the reference level in accordance with the magnitude and polarity of said electrical signal, means for forming a series of positive and negative pulses the respective durations of which are related to the position of the ramp waveform extending on either side of said reference level, means for recording said pulses on said storage medium as a series of adjacent segments which are oppositely polarized depending upon the polarity of the pulse to be recorded, each adjacent pair of said oppositely polarized segments having a boundary therebetween and the position of the boundaries between said segments being shifted in accordance with the duration of the recorded pulses, means for reproducing the signals of said recorded series of segments, means for forming from the reproduced signal of each segment a positive or negative pulse whose respective duration is related to the duration of the corresponding segment, thereby producing a series of positive and negative pulses, and means for recovering the magnitude and polarity of the electrical signal from said series of pulses.

4. Apparatus as set forth in claim 3 wherein said means for recovering said electrical signal include means for forming a digital number representative of the respective duration of each adjacent pair of positive and negative pulses.

5. Apparatus as set forth in claim 4 wherein said digital number producing means includes a reversible counter, means for supplying a plurality of periodic pulses to said counter, said counter being operative to count the periodic pulses in one direction in response to a pulse of one polarity and in the other direction in response to a pulse of the opposite polarity.

6. Apparatus for recording an electrical signal on a storage medium comprising means for producing a ramp waveform having a reference level, means for adding said electrical signal to said ramp waveform to shift the reference level in accordance with the magnitude and polarity of said electrical signal, means for forming a series of positive and negative pulses the respective durations of which are related to the portion of the ramp waveform extending on either side of said reference level, means for recording said pulses on said storage medium as a series of adjacent segments which are oppositely polarized depending upon the polarity of the pulse to be recorded, each adjacent pair of said oppositely magnetized segments having a boundary therebetween and the position of the boundaries between said segments being shifted in accordance with the duration of the recorded pulses, the spacing between said boundaries thereby indicating the magnitude and polarity of the electrical signal.

7. A recording system as set forth in claim 6 wherein said storage medium has magnetic properties and the recording means magnetizes said medium and fully saturates each recorded segment of said medium in the direction of magnetization.

8. Apparatus for reproducing an electrical signal which is recorded on a storage medium as a series of adjacent oppositely polarized segments having boundaries therebetween which determine the amplitude and polarity of the recorded electrical signal comprising means for reproducing the signals of said recorded segments, means for forming from the reproduced segments a series of signals having polarities and durations, each signal in the series corresponding respectively to the sense of polarization and the duration of the corresponding reproduced segment, and means for converting said series of signals into a signal representative of the amplitude and polarity of said recorded electrical signal.

9. Apparatus for reproducing an electrical signal which is recorded on a storage medium as a series of adjacent segments which are oppositely polarized, the duration of each said segment being related to the magnitude of the electrical signal and the polarization of the respectively different duration segments being related to the polarity of the electrical signal comprising means for reproducing the signals of said recorded series of segments, means for forming from each segment a positive or negative pulse whose respective polarity is related to the direction of polarization of the segment and whose respective duration is related to the duration of the corresponding segment, thereby forming a series of positive and negative pulses, and means for recovering the amplitude and polarity of said electrical signal from said series of pulses.

10. Apparatus for reproducing an electrical signal which is recorded on a storage medium as a series of adjacent segments which are oppositely polarized, the duration of the oppositely polarized segments being related to the magnitude and polarity of the electrical signal comprising means for picking up the signals of said recorded series of segments, means for forming from each segment a positive or negative pulse corresponding to the respective oppositely polarized segments, the duration of each pulse being related to the duration of the corresponding segment, thereby forming a series of positive and negative pulses, and means for forming a digital number representative of the respective duration of each adjacent pair of positive and negative pulses.

11. Apparatus for reproducing an electrical signal which is recorded on a storage medium as a series of adjacent segments which are oppositely polarized, the durations of oppositely polarized segments being related to the magnitude and polarity of the electrical signal comprising means for picking up the signals of said recorded series of segments, means for forming from each segment a positive or negative pulse corresponding to the respective oppositely polarized segments, the duration of each pulse being related to the duration of the corresponding segment, thereby forming a series of positive and negative pulses, and means for forming a digital number representative of the respective duration of each adjacent pair of positive and negative pulses, said last named means including a reversible counter, means for supplying a plurality of periodic pulses to said counter, said counter being operative to count the periodic pulses in one direction in response to a pulse of one polarity and in the other direction in response to a pulse of the opposite polarity.

12. Apparatus for recording an electrical signal on a storage medium comprising:
  means responsive to the magnitude and polarity of said electrical signal for producing a series of signals of alternating first and second polarities with the durations of both polarity signals determined by the magnitude of said electrical signal and the duration of the signals of one polarity with respect to signals of the other polarity determined by the polarity of said electrical signal,
  and means for recording said series of alternating signals as oppositely polarized segments on said storage medium, the location of the boundary between two adjacent oppositely polarized segments corresponding to the transition from a signal of one polarity to a signal of the other polarity being indicative of the magnitude and polarity of said electrical signal.

13. Apparatus for recording an electrical signal on a storage medium comprising:
  means for sensing the magnitude and polarity of said electrical signal,
  means for producing a series of signals of alternating first and second polarities,
  means responsive to said sending means for varying the respective duration of said series of alternating signals in a manner whereby an electrical signal to be recorded of greater than zero magnitude causes the duration of the signals of one of said first and second polarities to be longer than the duration of the signals of the other polarity,
  and means for recording said series of first and second polarity signals as oppositely polarized segments on said storage medium, the location of the boundary corresponding to the transition from a signal of one polarity to a signal of the other polarity between two adjacent oppositely polarized segments being indicative of the magnitude and polarity of said electrical signal.

14. Apparatus for recording an electrical signal on a storage medium comprising:
  means for producing a series of signals of alternating first and second polarities,
  means responsive to the magnitude and polarity of said electrical signal to be recorded for controlling the respective durations of said alternating signals of first and second polarities in a manner whereby the durations of signals of one polarity are increased with respect to the durations of signals of the other polarity by an amount corresponding to the magnitude of said electrical signal with the increase in the duration of the signals of one polarity or the other corresponding to the polarity of said electrical signal, and means for recording said series of alternating signals as oppositely polarized segments on said storage medium, the location of the boundary between two adjacent oppositely polarized segments corresponding to the transition from a signal of one polarity to a signal of the other polarity being indicative of the magnitude and polarity of said electrical signal being recorded.

15. Apparatus for recording an electrical signal on a storage medium comprising:

means responsive to the magnitude and polarity of said electrical signal for forming a series of signals having different polarity portions of variable duration with the combined duration of any two adjacent different polarity portions being substantially equal and the duration of the signals of one polarity with respect to the signals of the other polarity being determined by the magnitude and polarity of said electrical signal, and means for recording said series of signals on said storage medium as a series of adjacent differently polarized segments corresponding to said different polarity signals having boundaries therebetween corresponding to the transition of said series of signals from portions of one polarity to portions of another polarity, the position of said boundaries being shifted in accordance with the durations of the different polarity signals to be recorded and thereby being representative of both the magnitude and polarity of said electrical signal.

16. Apparatus as set forth in claim 15 wherein said means for forming said series of signals produces different polarity portions of substantially the same duration in response to a said electrical signal of substantially zero magnitude.

17. The method of recording an electrical signal on a storage medium comprising the steps of:

producing a series of signals of alternative first and second polarities, varying the duration of the signals of one polarity with respect to the signals of the other polarity in response to the polarity of said electrical signal, controlling the magnitude of the variation in duration of said signals of first and second polarities in accordance with the magnitude of said electrical signal, and recording said series of signals of alternating first and second polarities as corresponding oppositely polarized segments on said storage medium whose durations correspond to the respective corresponding durations of the signals in the series, a boundary occurring between adjacent oppositely polarized segments corresponding to the transition of said signals in said series from one polarity to the other.

18. The method of recording an electrical signal on a storage medium and reproducing the signal therefrom comprising the steps of:

producing a series of signals of alternating first and second polarities, varying the duration of the signals of one polarity with respect to the signals of the other polarity in response to the polarity of said electrical signal, controlling the magnitude of the variation in duration of said signals of first and second polarities in accordance with the magnitude of said electrical signal, recording said series of signals of alternating first and second polarities as corresponding oppositely polarized segments on said storage medium whose durations correspond to the respective corresponding durations of the signals in the series, a boundary occurring between adjacent oppositely polarized segments corresponding to the transition of said signals in said series from one polarity to the other, forming a second series of opposite polarity signals in response to said oppositely polarized segments and the boundaries therebetween, and reproducing the original electrical signal from said second series of opposite polarity signals.

References Cited by the Examiner

UNITED STATES PATENTS

| | | | |
|---|---|---|---|
| 2,599,305 | 6/52 | Westwood | 328—58 |
| 2,656,106 | 10/53 | Stabler | 340—347.4 |
| 2,887,674 | 5/59 | Greene | 340—174.1 |
| 3,032,765 | 5/62 | Begun et al. | 179—100.2 |
| 3,066,197 | 11/62 | Vernura | 179—100.2 |
| 3,087,026 | 4/63 | Daniels | 179—100.2 |

IRVING L. SRAGOW, *Primary Examiner.*